(12) United States Patent
Takeuchi et al.

(10) Patent No.: US 8,520,131 B2
(45) Date of Patent: Aug. 27, 2013

(54) PHOTOMETRIC DEVICE, IMAGING DEVICE, AND CAMERA

(75) Inventors: Hiroshi Takeuchi, Tokyo (JP); Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 208 days.

(21) Appl. No.: 12/818,466

(22) Filed: Jun. 18, 2010

(65) Prior Publication Data

US 2011/0090375 A1  Apr. 21, 2011

(30) Foreign Application Priority Data

Jun. 18, 2009  (JP) ................................ 2009-145194
Jul. 10, 2009  (JP) ................................ 2009-163856

(51) Int. Cl.
*H04N 5/232* (2006.01)
*G03B 13/00* (2006.01)
*H04N 5/225* (2006.01)
*H04N 5/222* (2006.01)

(52) U.S. Cl.
USPC ........................ 348/346; 348/169; 348/333.02

(58) Field of Classification Search
USPC .................... 348/222.1, 241, 333.01, 333.02, 348/333.03, 169, 345–346, 348
See application file for complete search history.

(56) References Cited

U.S. PATENT DOCUMENTS

| 7,433,586 B2 * | 10/2008 | Onozawa ....................... 396/121 |
| 8,013,896 B2 * | 9/2011 | Tachibana et al. ......... 348/208.5 |
| 8,194,173 B2 * | 6/2012 | Kawahara et al. ............ 348/345 |
| 2004/0201767 A1 * | 10/2004 | Niikawa et al. .......... 348/333.03 |
| 2005/0231628 A1 * | 10/2005 | Kawaguchi et al. .......... 348/345 |
| 2009/0153666 A1 * | 6/2009 | Takeuchi et al. .............. 348/169 |
| 2009/0316016 A1 * | 12/2009 | Iwamoto .................... 348/222.1 |
| 2009/0322885 A1 * | 12/2009 | Ogasawara et al. ........... 348/169 |
| 2012/0206642 A1 * | 8/2012 | Takahashi ..................... 348/362 |

FOREIGN PATENT DOCUMENTS

| JP | A-11-215409 | 8/1999 |
| JP | A-2001-296584 | 10/2001 |
| JP | A-2002-139773 | 5/2002 |
| JP | A-2003-333424 | 11/2003 |
| JP | A 2006-203346 | 8/2006 |
| JP | A 2007-047769 | 2/2007 |
| JP | A-2007-057933 | 3/2007 |
| JP | A-2007-072286 | 3/2007 |
| JP | A-2007-282063 | 10/2007 |
| JP | A-2008-141411 | 6/2008 |
| JP | A-2008-160620 | 7/2008 |
| JP | A-2008-187331 | 8/2008 |

OTHER PUBLICATIONS

Japanese Office Action issued in Japanese Patent Application No. 2009-163856 dated Nov. 15, 2011.

(Continued)

*Primary Examiner* — Kelly L Jerabek
(74) *Attorney, Agent, or Firm* — Oliff & Berridge, PLC

(57) ABSTRACT

A photometric device includes: an imaging unit that captures an image formed by an optical system, with a marker capable of switching between display and non-display disposed in a light path of the optical system; and a correction unit that, based upon a difference between a first image captured by the imaging unit in a state where the marker is displayed and a second image captured by the imaging unit in a state where the marker is not displayed, performs a correction of a third image that is different from the first image and the second image.

3 Claims, 11 Drawing Sheets

(56) References Cited

OTHER PUBLICATIONS

Japanese Office Action issued in Japanese Patent Application No. 2009-145194 dated Nov. 15, 2011.

Office Action issued in Japanese Application No. 2009-163856 dated Sep. 11, 2012 (with translations).

Jul. 2 Notification of Reasons for Refusal issued in Japanese Application No. 2009-163856 (with English translation).

* cited by examiner

3 : LENS DRIVE UNIT
4 : DISTANCE DETECTION UNIT
5 : APERTURE CONTROL UNIT
6 : LENS-SIDE MICROCOMPUTER
23 : BODY-SIDE MICROCOMPUTER
24 : FOCUS DETECTION UNIT
25 : SHUTTER CONTROL UNIT
26 : IMAGE SENSOR DRIVE UNIT
27 : IMAGE PROCESSING UNIT
28 : IMAGE SENSOR DRIVE UNIT
29 : DISPLAY PANEL CONTROL UNIT
30 : LED DRIVE UNIT

PHOTOMETRIC DEVICE, IMAGING DEVICE, AND CAMERA

INCORPORATION BY REFERENCE

The disclosures of the following priority applications are herein incorporated by reference:

Japanese Patent Application No. 2009-145194 filed Jun. 18, 2009

Japanese Patent Application No. 2009-163856 filed Jul. 10, 2009

BACKGROUND OF THE INVENTION

1. Field of the Invention

The present invention relates to a photometric device, an imaging device, and a camera.

2. Description of Related Art

Japanese Laid Open Patent Publication No. 2006-203346 discloses a single-lens reflex camera that captures an image through the viewfinder by an image sensor and performs an analysis of the scene based upon obtained image data. Japanese Laid Open Patent Publication No. 2007-47769 discloses a display device that displays a subject image in the field of view of the viewfinder with a mark overlaid upon the subject image.

A digital camera that superimposes a marker of an AF frame, an AF area, or the like, which indicates a detection point in autofocus, in the light path of the viewfinder may have an affect on an analysis result when an image of the marker of the AF frame, the AF area, or the like is captured by the image sensor for analysis.

SUMMARY OF THE INVENTION

A photometric device according to a first aspect of the present invention comprises: an imaging unit that captures an image formed by an optical system, with a marker capable of switching between display and non-display disposed in a light path of the optical system; and a correction unit that, based upon a difference between a first image captured by the imaging unit in a state where the marker is displayed and a second image captured by the imaging unit in a state where the marker is not displayed, performs a correction of a third image that is different from the first image and the second image.

According to a second aspect of the present invention, in the photometric device according to the first aspect, based upon the difference, the correction unit may detect a position of an image of the marker in an image captured by the imaging unit and, based upon the detection result, performs the correction.

According to a third aspect of the present invention, in the photometric device according to the second aspect, based upon the position of the image of the marker, the correction unit may perform the correction for an image of a portion in the third image corresponding to the position.

According to a fourth aspect of the present invention, in the photometric device according to the first aspect, the first image and the second image may be captured by the imaging unit under a same image-capturing condition.

An imaging device according to a fifth aspect of the present invention comprises: an imaging unit that captures an image formed by an optical system with a marker capable of switching between display and non-display disposed in a light path of the optical system; a detection unit that, based upon an image captured by the imaging unit in a state where the marker is displayed, detects a position of an image of the marker formed on an imaging plane of the imaging unit; and a recording unit that records the position of the image of the marker detected by the detection unit.

According to a sixth aspect of the present invention, in the imaging device according to the fifth aspect, the detection unit may detect the position of the image of the marker based upon a first image captured by the imaging unit in a state where the marker is displayed and a second image captured by the imaging unit in a state where the marker is not displayed.

According to a seventh aspect of the present invention, the imaging device according to the sixth aspect may further comprise a correction unit that, based upon the position of the image of the marker recorded in the recording unit, performs a correction of a third image among images captured by the imaging unit, with the third image different from the first image and the second image.

According to a eighth aspect of the present invention, in the imaging device according to the seventh aspect, based upon the position of the image of the marker, the correction unit may perform the correction for an image of a portion in the third image corresponding to the position.

According to a ninth aspect of the present invention, in the imaging device according to the sixth aspect, the first image and the second image may be captured by the imaging unit under a same image-capturing condition.

According to a tenth aspect of the present invention, the imaging device according to the fifth aspect may further comprise a control unit that controls on and off of a power of the imaging device, and it is preferable that the detection unit detects the position of the image of the marker when the power is turned off; and the recording unit records the position of the image of the marker when the detection unit detects the position.

A camera according to a eleventh aspect of the present invention comprises: an imaging unit that captures a subject image to obtain an image; and an erasure unit that erases information displayed superimposed on the image obtained by the imaging unit by replacing a pixel on which the information is displayed with its adjacent pixel.

According to a twelfth aspect of the present invention, in the camera according to the eleventh aspect, the information may be information indicating a placement position of a range finding sensor in a photographic screen.

According to a thirteenth aspect of the present invention, the camera according to the eleventh aspect may further comprise: a synthesis unit that synthesizes a plurality of images in which the information has been erased by the erasure unit.

According to a fourteenth aspect of the present invention, in the camera according to the thirteenth aspect, it is preferable that the synthesis unit uses one of the plurality of images as a template image so as to perform template matching with another image and, based upon a result of the template matching, performs alignment of the plurality of images to be synthesized.

DESCRIPTION OF PREFERRED EMBODIMENTS

The embodiment of the present invention will now be explained with reference to the figures.

The First Embodiment

Figure 1:
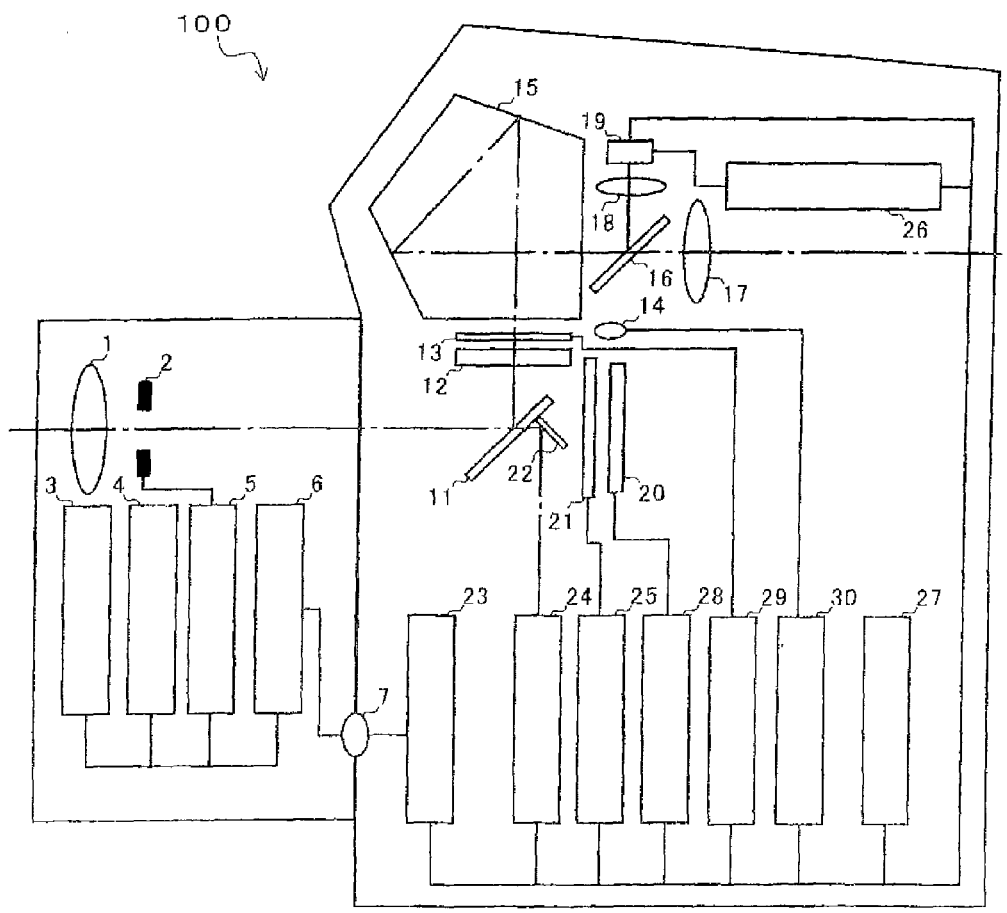
FIG. 1 is a function block diagram of a camera according to the first embodiment of the present invention.

FIG. 1 is a function block diagram of a camera 100 of the first embodiment. The camera 100 is a single-lens reflex digital camera. As shown in FIG. 1, the camera 100 is constituted with a lens section and a body section. The lens section includes an extendable photographic lens 1, an aperture 2, a lens drive unit 3 that drives the photographic lens 1, a distance detection unit 4 that detects the focal distance of the photographic lens 1, an aperture control unit 5 that controls the aperture 2, and a lens-side microcomputer 6 that controls each unit of the lens section. In addition, the camera 100 includes an electrical contact 7 that electrically connects the lens section with the body section.

The lens drive unit 3 extends the photographic lens 1 for focusing, and the distance detection unit 4 detects an amount of lens extension of the photographic lens 1 to detect a distance at which the photographic lens 1 forms an image. Each of the functions explained above is controlled by a lens-side microcomputer 6.

The camera section includes a quick-return mirror 11 for dividing a light flux from the photographic lens 1, a focusing screen 12, an AF frame display panel 13, an LED 14 for illuminating the AF frame display panel 13, and a pentaprism 15, as well as a half mirror 16 for dividing a light flux from the pentaprism 15. In addition, the camera section includes an eyepiece 17 used for composition confirmation of the light flux from the half mirror 16, an image re-forming lens 18 for obtaining information of a subject described later, and an image sensor 19 for analysis.

The AF frame display panel 13 includes, for instance, a structure in which a transparent electrode and a PN liquid crystal are sandwiched by transparent plates and a liquid crystal display element that can switch display and non-display of the AF frame. In addition, the LED 14 is lit so as to illuminate an AF frame which is displayed in a dark field of view. For example, if a red LED is provided as the LED 14, an AF frame displayed on the AF frame display panel 13 is lit in red.

The image sensor 19 for analysis is, for instance, an image sensor such as a CCD image sensor, a CMOS image sensor, or the like. For pixels of the image sensor 19 for analysis, on-chip color filters in red, green, blue, and the like are provided, for example, in the order of the Bayer array. By the image sensor 19 for analysis, image information including color information can be obtained.

In addition, the camera section includes an image sensor 20 for image, which captures an image, and a shutter 21, as well as a sub mirror 22 that guides a light flux used for focus detection. In addition, the camera section includes a body-side microcomputer 23 that performs control of each section, a focus detection unit 24, and a shutter control unit 25 that controls the shutter 21. In addition, the camera section includes an image sensor drive unit 26 that drives the image sensor 19 for analysis, an image processing unit 27 for performing image processing on an image obtained by the image sensor 20 for image, and an image sensor drive unit 28 that drives the image sensor 20 for image. In addition, the camera section includes a display panel control unit 29 that controls display of the AF frame display panel 13 and an LED drive unit 30 that drives the LED 14.

After having undergone image processing by the image processing unit 27 as appropriate, image information obtained by the image sensor 19 for analysis is used for a variety of analysis calculations, a photometric calculation, a body control calculation, and the like.

A light flux from the subject passes through the photographic lens 1 and the aperture 2 and is guided to the quick-return mirror 11. At the time of photography, the quick-return mirror 11 flips up and the shutter 21 opens, so that the light flux from the subject forms an image through the photographic lens 1 on an imaging plane of the image sensor 20 for image. Then, an image signal from the image sensor 20 for image is digitized by an A/D converter not shown in the figures and, after having undergone the image processing by the image processing unit 27, is stored in a RAM not shown in the figures.

On the occasion other than the time of photography, i.e., at the time of confirmation of composition or the like, the quick-return mirror 11 flips down, and a part of the light flux from the subject is reflected by the quick-return mirror 11 and forms an image on the focusing screen 12. The image is guided to the half mirror 16 through the AF frame display panel 13 and the pentaprism 15, and the light flux having transmitted through the half mirror 16 reaches the eyepiece 17. The user can confirm the composition by observing the image through the eyepiece 17. In addition, an image of the AF frame displayed on the AF frame display panel 13 is superimposed upon the image observed by the user at this time. On the other hand, the light flux reflected by the half mirror 16 forms an image on the image sensor 19 for analysis through the image re-forming lens 18.

The image sensor 19 for analysis, being provided separately from the image sensor 20 for image, which is used for photography, is a CCD area sensor or a CMOS area sensor, which can generate an image of the subject. The image sensor 19 for analysis can generate an image of the subject even in a state in which the quick-return mirror 11 flips down, the shutter 21 closes, and imaging by the image sensor 20 for image is not performed. In addition, the image sensor 19 for analysis also serves as a photometric/colorimetric sensor such as an exposure control sensor and a white balance control sensor and a subject analysis sensor described later. An image signal from the image sensor 19 for analysis is digitized by the A/D converter not shown in the figures and stored in the RAM or the like not shown in the figures.

On the occasion other than the time of photography, i.e., at the time of confirmation of composition or the like, the part of the light flux from the subject, which has transmitted through the quick-return mirror 11 in a down state, is guided to the focus detection unit 24 by the sub mirror 22. The focus detection unit 24 performs focus detection in a so-called phase difference method, in which, using a light flux passing through the photographic lens 1, two images of the subject having a parallax are guided onto a pair of image sensor arrays and a relative displacement amount of the images is calculated from the image output of the image sensor arrays so as to determine the focusing state.

Each of the sections having been explained so far is basically controlled by the body-side microcomputer 23. Each control program of the body-side microcomputer 23 is stored in advance in a ROM not shown in the figures or the like. An image generated by the image sensor 20 for image and stored in memory is output to an external storage device such as a memory card or the like as a file and is provided for use by the user. The body-side microcomputer 23 is connected with the lens-side microcomputer 6 through the electrical contact 7. The body-side microcomputer 23 controls the lens-side microcomputer 6 through the electrical contact 7.

In the camera 100 with the structure explained above, image information obtained by the image sensor 19 for analysis is, as described above, used for the variety of analysis calculations, the photometric calculation, the body control calculation, and the like. However, the image sensor 19 for analysis may capture an image of the marker of the AF frame, the AF area, or the like displayed on the AF frame display panel 13. In this case, an error occurs in the image information obtained by the image sensor 19 for analysis, and thus reliabilities of the variety of analysis calculations, the photometric calculation, the body control calculation, and the like based upon the image information may be reduced.

The body-side microcomputer 23 therefore detects the position of the image of the marker of the AF frame, the AF area, or the like captured in the image sensor 19 for analysis. An example in which a total of 15 AF frames from A1 to A15 are displayed on the AF frame display panel 13 will now be explained. In addition, an example in which a red LED is provided as the LED 14 will be explained.

Position detection of the AF frames is performed by the body-side microcomputer 23 in any of the following timings. The timing in which the position detection of the AF frames is performed may be predetermined or may be designated or modified by the user.

1) When the Camera 100 is Powered Off

During the camera 100 is powered on or the camera 100 is in operation, the user may make a sudden transition to a photography operation or may confirm the composition through the viewfinder (the eyepiece 17). Therefore, position detection of an AF frame is performed when the camera 100 is powered off, the timing in which such influence is considered to be the least.

It is to be noted that the position detection of the AF frame is not necessarily performed every time the camera 100 is powered off. For example, the position detection of the AF frame may be performed once every few power-offs.

In addition, the position detection of the AF frame may be performed in both of the case in which the camera 100 is automatically turned off by the body-side microcomputer 23, which is so-called auto off, and the case in which the camera 100 is manually turned off by a user operation through an operating unit which is not shown in the figures, or the position detection of the AF frame may be performed only in either one of those cases.

2) Predetermined Timing by a Timer or the Like

The position detection of the AF frame is performed at a predetermined timing such as once a week or once a month.

3) When the User Issues an Execution Instruction

The position detection of the AF frame is performed when an execution instruction for position detection of the AF frame is issued by the user operation through the operating unit which is not shown in the figures.

Figure 3:
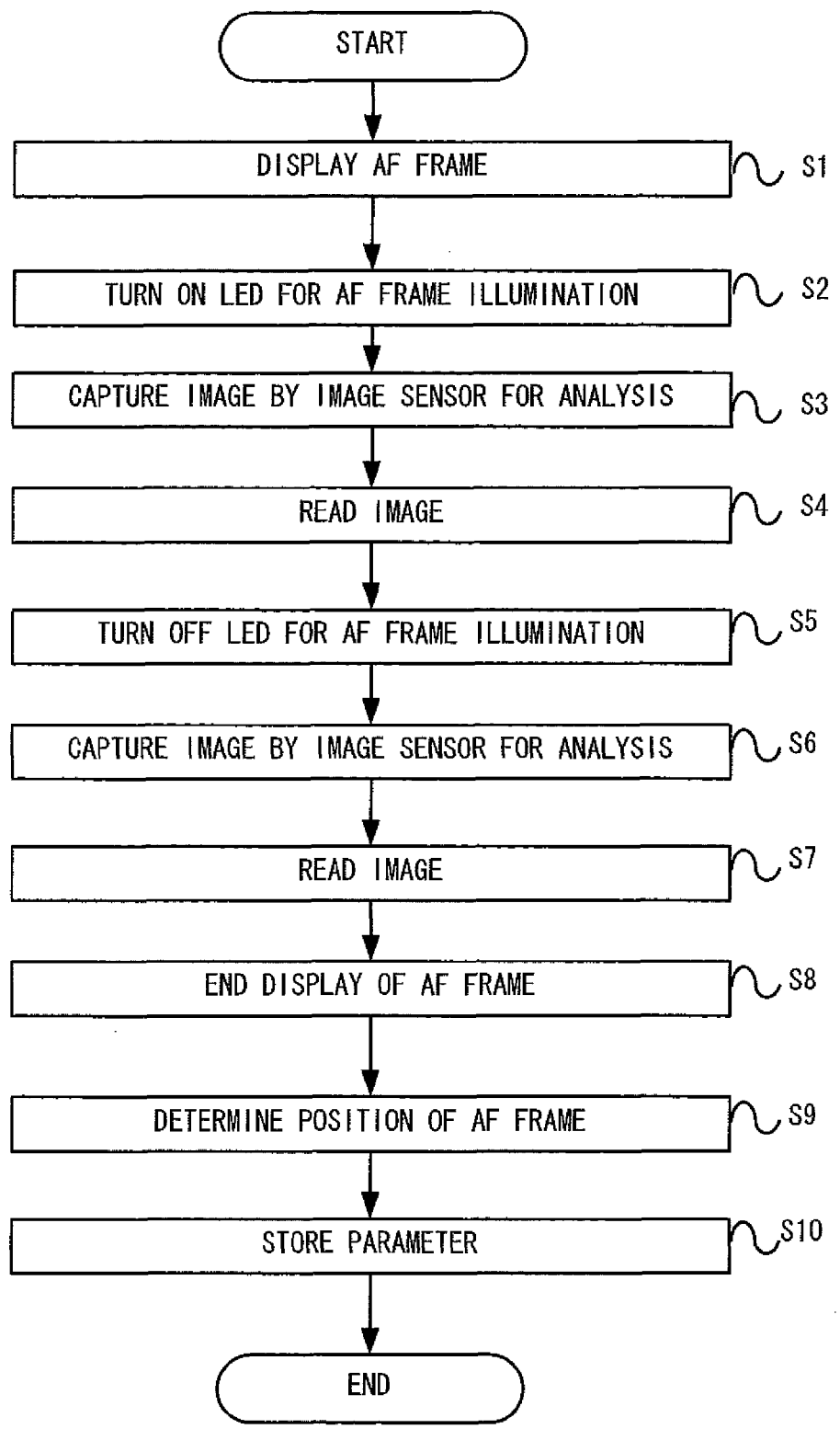
FIG. 3 is a flowchart showing the operation of a body-side microcomputer when detecting the position of an AF frame.

The operation of the body-side microcomputer 23 when the position detection of the AF frame is performed will now be explained with reference to the flowchart shown in FIG. 3. The program for performing processing shown in the flowchart of FIG. 3 is stored in a memory which is not shown in the figures.

In a step S1, the body-side microcomputer 23 controls the display panel control unit 29 so as to cause AF frames to be displayed on the AF frame display panel 13. The body-side microcomputer 23 causes AF frames shown in bold, i.e., A1 (top left), A5 (top right), A11 (bottom left), and A15 (bottom right), among the total of 15 AF frames presented in FIG. 2 as examples to be displayed on the AF frame display panel 13.

In a step S2, the body-side microcomputer 23 controls the LED drive unit 30 so as to light the LED 14 for AF frame illumination.

In a step S3, the body-side microcomputer 23 controls the image sensor drive unit 26 so as to capture an image by the image sensor 19 for analysis. At this time, the body-side microcomputer 23 captures an image by the image sensor 19 for analysis with a predetermined gain and a predetermined exposure time.

In a step S4, the body-side microcomputer 23 reads the image generated by the image-capturing in the step S3 into a RAM which is not shown in the figures. At this time, if necessary, the body-side microcomputer 23 performs image processing by the image processing unit 27 upon the image generated by the image-capturing in the step S3.

In a step S5, the body-side microcomputer 23 controls the LED drive unit 30 so as to turn off the LED 14 for AF frame illumination.

In a step S6, the body-side microcomputer 23 controls the image sensor drive unit 26 so as to capture an image by the image sensor 19 for analysis. At this time, the body-side microcomputer 23 captures an image by the image sensor 19 for analysis with a predetermined gain and a predetermined exposure time explained in the step S3. That is, in the step S3 and in the step S6, the body-side microcomputer 23 captures an image with the same gain and the same exposure time. However, in the step S3 the AF frame display panel 13 is illuminated by the LED 14, whilst in the step S6 the AF frame display panel 13 is not illuminated by the LED 14.

In a step S7, the body-side microcomputer 23 reads the image generated by the image-capturing in the step S6 into the RAM which is not shown in the figures. It is to be noted that if any image processing is being performed in the step S4, the body-side microcomputer 23 performs the same image processing by the image processing unit 27 upon the image generated by the image-capturing in the step S6.

In a step S8, the body-side microcomputer 23 controls the display panel control unit 29 so as to terminate the display of the AF frames upon the AF frame display panel 13.

In a step S9, the body-side microcomputer 23 determines the positions of the AF frames based upon the images read in the step S4 and in the step S7.

The body-side microcomputer 23 firstly converts a Bayer image into images in three colors of RGB with respect to each of the image read in the step S4, in which the AF frame display panel 13 is illuminated by the LED 14, and the image read in the step S7, in which the AF frame display panel 13 is not illuminated by the LED 14.

The LED 14 is a red LED as described above. Therefore, with respect to the R image among the images in the three colors of RGB, the pixel value of the image in which the AF frame display panel 13 is not illuminated by the LED 14 is subtracted from the pixel value of the image in which the AF frame display panel 13 is illuminated by the LED 14, so that there remains only an output of pixels corresponding to the position of the AF frame that is captured in the image sensor 19 for analysis.

It is to be noted that if the value of the difference described above falls below a predetermined value, a decision can be made that there is not a sufficient difference between the image in which the AF frame display panel 13 is illuminated by the LED 14 and the image in which the AF frame display panel 13 is not illuminated by the LED 14. In this case, it is difficult to perform an accurate position detection of the AF frame even if subsequent calculations are performed. In this case, therefore, it is preferable to perform irregular processing such as canceling the subsequent calculations, not storing results of the subsequent calculations, starting the processing from the step S1 over again, and informing the user of an error.

On the other hand, if the value of the difference described above exceeds the predetermined value, a decision can be made that there is a sufficient difference between the image in which the AF frame display panel 13 is illuminated by the LED 14 and the image in which the AF frame display panel 13 is not illuminated by the LED 14. In this case, the body-side microcomputer 23 determines the pixel coordinates of points of attention, for instance, the pixel coordinates of four points of attention of FIG. 2, i.e., points P1 to P4. The pixel coordinates can be determined by known edge detection, template matching, or the like. Hereinafter, the coordinates of the point P1, the top left point of the AF frame A1 situated at the top left, is designated as (X1, Y1), the coordinates of the point P2, the top right point of the AF frame A5 situated at the top right, is designated as (X2, Y2), the coordinates of the point P3, the bottom left point of the AF frame A11 situated at the bottom left, is designated as (X3, Y3), and the coordinates of the point P4, the bottom right point of the AF frame A15 situated at the bottom right, is designated as (X4, Y4).

Figure 2:
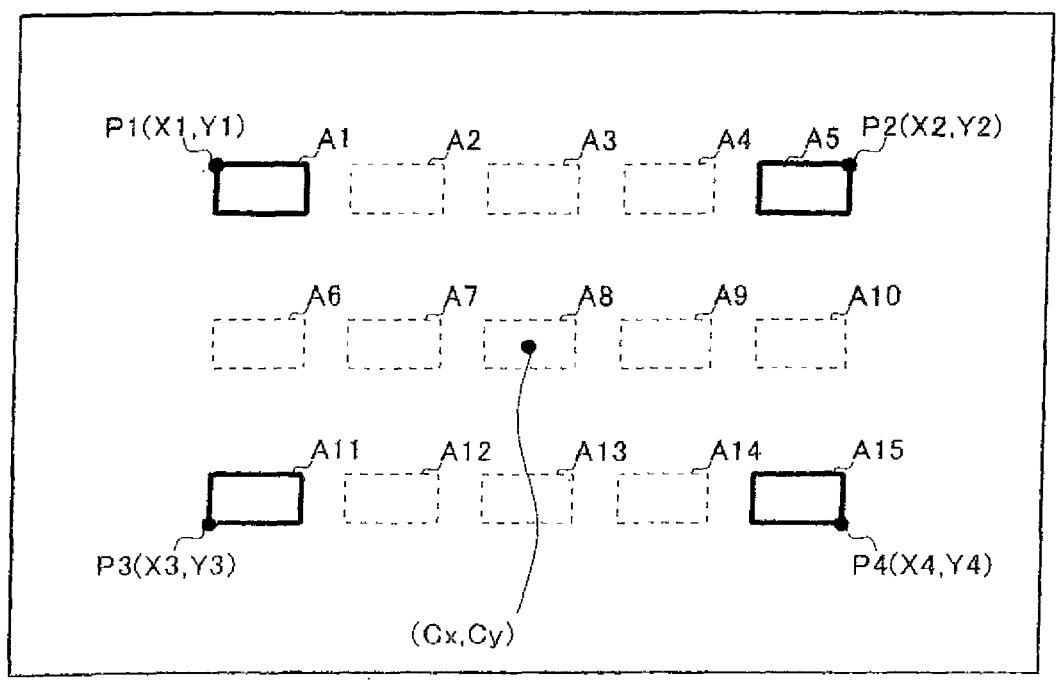
FIG. 2 is a figure illustrating AF frames displayed on an AF frame display panel.

Based upon the pixel coordinates of the four points of attention, the points P1 to P4, described above, the body-side microcomputer 23 determines the overall central position, angular displacement, magnification displacement, and the like of the total of 15 AF frames presented in FIG. 2 as an example so as to determine the positions of the AF frames.

The central position (Cx, Cy) is determined by the following equation 1 and equation 2.

$Cx = (X1+X2+X3+X4)/4$ (Equation 1)

$Cy = (Y1+Y2+Y3+Y4)/4$ (Equation 2)

The angular displacement (θ) is determined by the following equation 3.

$θ = \text{Arctan}\{((Y2+Y4)/2)-((Y1+Y3)/2)/((X2+X4)/2)-((X1+X3)/2)\}$ (Equation 3)

The horizontal magnification displacement (Mx) and the vertical magnification displacement (My) are determined by the following equation 4 and equation 5.

$Mx = \{(X2-X2+X4-X3)/2\}/(\text{designed number of pixels } X2-X1)$ (Equation 4)

$My = \{(Y1-Y3+Y2-Y4)/2\}/(\text{designed number of pixels } Y1-Y3)$ (Equation 5)

In this way, the parameters showing the positions of the AF frames, which represent the total of 15 AF frames presented in FIG. 2 as an example, can be determined.

It is to be noted that the calculation methods described above are examples and a greater number of points may be detected so as to increase the accuracy. For instance, the similar processing may be performed for the AF frame A8 of the center so as to detect the central position more directly. In addition, the position may be determined for each AF frame if the image of the marker of the AF frame, the AF area, or the like which is captured in the image sensor 19 for analysis is affected by aberration or the like in the imaging plane of the image sensor 19 for analysis. In addition, a variety of weighting calculations may be applied or results of previous position detections of the AF frames may be considered.

In a step S10, the body-side microcomputer 23 stores the parameters indicating the positions of the AF frames determined in the step S9. At this time, the body-side microcomputer 23 stores the parameters in a nonvolatile storage device such as an EEPROM. In addition, the body-side microcomputer 23 powers off the camera 100 as necessary and terminates the series of processing.

The method of use of the parameters stored as explained above will be explained. After being stored, the parameters are used as follows when image-capturing is performed by the image sensor 19 for analysis.

1) Correction of an Image Generated by Image-Capturing by the Image Sensor 19 for Analysis Based upon the parameters, the body-side microcomputer 23 corrects the image generated by the image-capturing by the image sensor 19 for analysis so as to limit the effect of the image of the AF frames captured in the image sensor 19 for analysis.

When an image-capturing is performed by the camera 100, for instance, an image-capturing is performed by the image sensor 19 for analysis while the release button is pressed halfway down. Since the image of the AF frames displayed on the AF frame display panel 13 is captured in the image sensor 19 for analysis, the body-side microcomputer 23, based upon the parameters, specifies the pixels in which the AF frames are captured, and corrects the pixel values of the specified pixels by calculation.

Supposing that the pixel positions of the pixels corresponding to the AF frames displayed on the AF frame display panel 13 are a set of points represented by (An, Bn) indicating a set of pixel positions based upon design of the pixels corresponding to the AF frames, which is a set of n. The (An, Bn) undergoes coordinate transformation using the parameters so as to specify a pixel to be corrected. Supposing that the pixel position of the pixel to be corrected is represented by (Cn, Dn), the (Cn, Dn) is determined by the following equation 6.

$$\begin{bmatrix} Cn \\ Dn \end{bmatrix} = \begin{bmatrix} \cos θ & \sin θ \\ -\sin θ & \cos θ \end{bmatrix} \begin{bmatrix} Mx & 0 \\ 0 & My \end{bmatrix} \begin{bmatrix} An \\ Bn \end{bmatrix} + \begin{bmatrix} Cx \\ Cy \end{bmatrix}$$ Equation 6

The body-side microcomputer 23 corrects the value of RGB or the value of YCbCr of the pixel of (Cn, Dn) determined in the above manner. Corrections include a method in which the pixel value of the pixel of (Cn, Dn) is replaced with another value, a method in which the pixel value itself of the pixel of (Cn, Dn) is corrected, and a method in which the pixel value of the pixel of (Cn, Dn) is ignored.

In the event that the pixel value of the pixel of (Cn, Dn) is replaced with another value, for instance, a pixel value of a neighboring pixel is used for the replacement. At this time, if another pixel to be corrected exists in the vicinity of the pixel to be corrected, it is preferable to use a pixel value of a neighboring pixel except the other pixel.

In the event that the pixel value itself of the pixel of (Cn, Dn) is corrected, based upon the parameters, the pixel value is corrected by adding/subtracting a predetermined value to/from the pixel value of the pixel of (Cn, Dn) or by multiplying the pixel value of the pixel of (Cn, Dn) by a predetermined gain.

In the event that the pixel value of the pixel of (Cn, Dn) is ignored, the reliabilities of the variety of calculations can be prevented from being reduced by ignoring the value of the pixel when the variety of analysis calculations, the photometric calculation, the body control calculation, and the like are performed using the image information obtained by the image sensor 19 for analysis.

Even if the image of the AF frame displayed on the AF frame display panel 13 is captured in the image sensor 19 for analysis, an accurate analysis result can be obtained by performing the variety of analysis calculations, the photometric calculations, the body control calculation, and the like based upon the image information having undergone the correction as described above.

For instance, an accurate face detection can be performed when the face detection calculation is performed using corrected image information. In addition, an accurate tracking calculation can be performed by so-called template matching for searching a part with the highest similarity to the color or brightness pattern information of the subject stored in advance among images for analysis being input continuously using the corrected image information. In addition, when the photometric calculation is performed using the corrected image information, effects such as a partial brightness reduction are prevented and thus more accurate photometric calculation can be performed.

2) Focusing Based Upon an Output of the Image Sensor 19 for Analysis

When the focus detection unit 24 performs focus detection using position information of the AF frame included in the image information obtained by the image sensor 19 for analysis, the position information of the AF frame included in the image information obtained by the image sensor 19 for analysis is corrected using parameters. Then, the focus detection unit 24 performs the focus detection using the position information of the corrected AF frame so as to perform more accurate focus detection.

As explained above, according to the present embodiment, the photometric device includes an image sensor that captures an image from an optical system through a marker that can switch display and non-display or hide disposed in the light path of the optical system and, based upon the difference between a first image captured by the image sensor in a state where the marker is displayed and a second image captured by the image sensor in a state where the marker is not displayed, performs correction of a third image, which is different from the first image and the second image that are captured by the image sensor. Therefore, even if there is a marker existing in the light path of the optical system, the use of the third image as a modifier causes an accurate analysis result to be obtained without being affected by the marker.

In addition, the position of the marker described above may slightly change due to a change with the passage of time, an external shock, or the like. Even in such a circumstance, to perform the processing described above causes an accurate analysis result to be obtained.

It is to be noted that each of the processing explained in the present embodiment is an example and the present invention is not limited to the example. For instance, the AF frame shown in FIG. 2 is an example and the present invention can be applied in the same manner to those with layouts and sizes other than that.

In addition, the structure and the combination of the AF frame display panel 13 and the LED 14 are each an example, the present invention can be applied in the same manner to structures and combinations other than those. For instance, the photometric device may include, in place of the LED 14, an illumination device that can independently illuminate each of a plurality of AF frames or an illumination device that can change the color of the illumination. In this case, for example, the user can be informed with an error by changing the color of the illumination that illuminates the AF frame. In addition, the photometric device may include, in place of the AF frame display panel 13 and the LED 14, a light-emitting display sensor that can display and illuminate the AF frame at the same time.

In addition, the series of processing explained in FIG. 3 of the present embodiment is an example and the present invention is not limited to the example. For instance, while in the example of FIG. 3, an image captured with illumination by the LED 14 and an image captured without illumination by the LED 14 are obtained in a state where the AF frame is displayed on the AF frame display panel 13, the AF frame may not be displayed on the AF frame display panel 13 when an image is captured without illumination by the LED 14. In other words, it is also acceptable to obtain an image captured with the AF frame displayed on the AF frame display panel 13 and with illumination by the LED 14 and an image captured with the AF frame not displayed on the AF frame display panel 13 and without illumination by the LED 14 and to perform the same processing. In addition, it is also acceptable to obtain an image captured with the LED 14 constantly in an turned off state and with the AF frame displayed on the AF frame display panel 13 and an image captured with the AF frame not displayed on the AF frame display panel 13 and to perform the same processing.

In addition, in the present embodiment, it is also acceptable to determine the position of the AF frame only from an image captured with illumination by the LED 14 in a state where the AF frame is displayed on the AF frame display panel 13. In addition, it is also acceptable to determine the position of the AF frame only from an image captured without illumination by the LED 14 in a state where the AF frame is displayed on the AF frame display panel 13.

In addition, the present invention can be effectively used also when images continuously captured by the image sensor 19 for analysis are stored as a moving image in the present embodiment. In this case, the correction described above may be performed every time image-capturing is performed by the image sensor 19 for analysis. In addition, the correction described above may be performed only when the images are stored as a moving image.

In addition, the camera 100 presented in the present embodiment is an example and the present invention can be applied in the same manner to cameras with other structures. For example, the present invention can be applied in the same manner to a silver film camera and a camera in which the lens and the body are integrally configured.

The Second Embodiment

When a mark superimposed on a subject image in the field of view of the viewfinder is displayed, the subject is hidden by the displayed mark, which may result in a problem in performing face detection and the like. Therefore, in the second embodiment, information superimposed on the image is erased. The second embodiment of the present invention will now be explained in detail.

Figure 4:
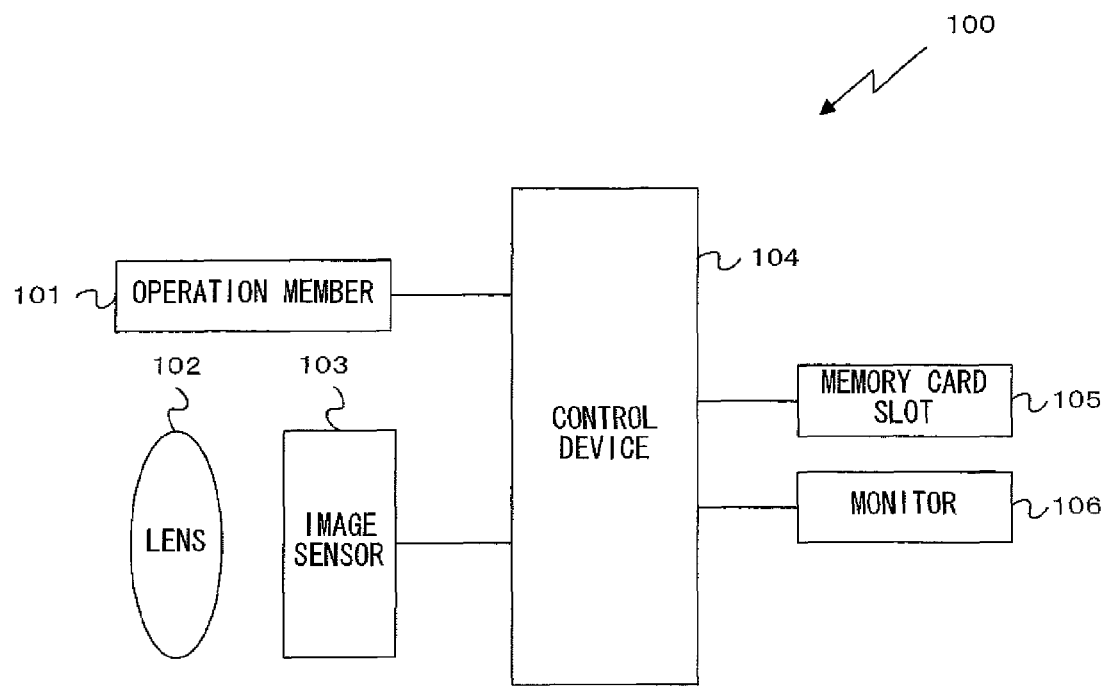
FIG. 4 is a block diagram showing the structure of the second embodiment of the present invention.

FIG. 4 is a block diagram showing the structure of a camera in the second embodiment. A camera 100A includes an operating member 101, a lens 102, an image sensor 103, a control device 104, a memory card slot 105, and a monitor 106. The operating member 101 includes a variety of input members to be operated by the user, for instance, a power button, a shutter release button, a zoom button, an arrow key, a decision button, a reproduction button, a delete button, and the like.

Although the lens 102 is constituted with a plurality of optical lenses, just one lens is illustrated in FIG. 4 as a representative. The image sensor 103 is an image sensor, for example, a CCD, a CMOS, or the like, which captures a subject image formed by the lens 102. Then, an image signal obtained by the image-capturing is output to the control device 104.

Based upon an image signal input from the image sensor 103, the control device 104 generates image data (hereinafter referred to as the main image data) in a predetermined image format, e.g., JPEG format. In addition, based upon the generated image data, the control device 104 generates image data for display, e.g., thumbnail image data. The control device 104 generates an image file that includes the generated main image data and the thumbnail image data together with header information and outputs it to the memory card slot 105. In the present embodiment, both the main image data and the thumbnail image data are image data represented in the RGB color system.

The memory card slot 105 is a slot into which a memory card is inserted as a storage medium, and writes and stores an image file output from the control device 104 into the memory card. In addition, based upon an instruction from the control device 104, the memory card slot 105 reads an image file stored in the memory card.

The monitor 106 is a liquid crystal monitor (rear monitor) mounted on the rear surface of the camera 100, on which an image stored in the memory card, a setup menu for setting up the camera 100A, and the like are displayed. In addition, when the user sets the mode of the camera 100A into the capturing mode, the control device 104 outputs image data for display of the images obtained in chronological order from the image sensor 103 to the monitor 106. As a result, a through image or live view image is displayed on the monitor 106.

The control device 104, being constituted with a CPU, a memory, and other peripheral circuits, controls the camera 100A. It is to be noted that the memory constituting the control device 104 includes a SDRAM and a flash memory. A SDRAM is a volatile memory, which is used as a work memory for deploying a program when the CPU executes the program or used as a buffer memory for temporarily storing data. In addition, the flash memory is a nonvolatile memory, in which the data of a program executed by the control device 104, a variety of parameters loaded when the program is executed, and the like are stored.

Figure 5:
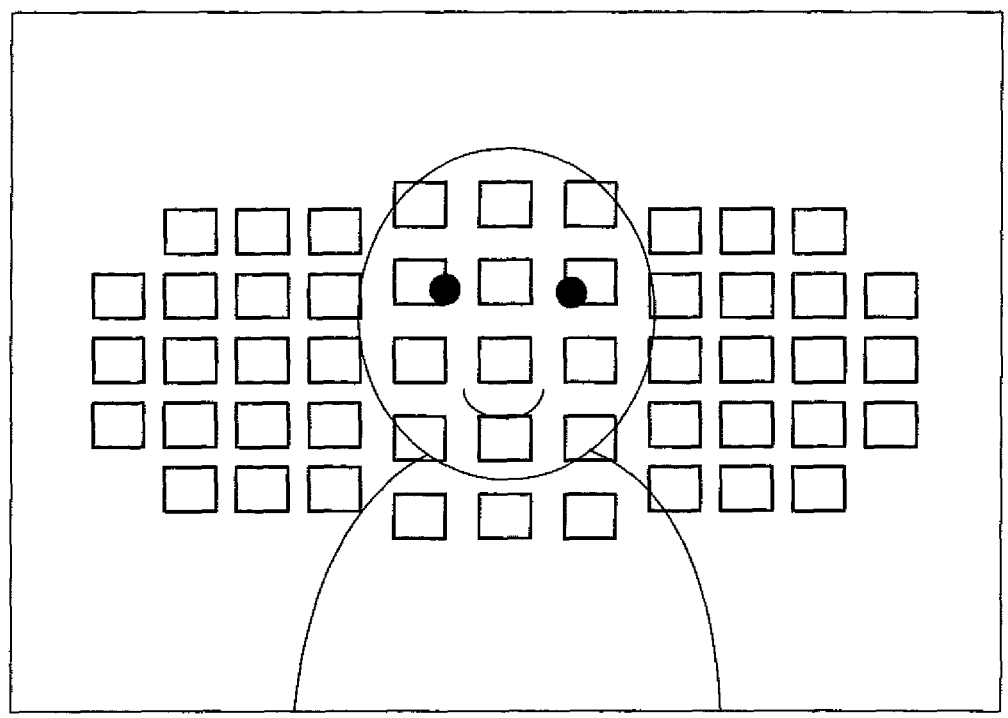
FIG. 5 is a figure showing an example of display of an AF frame in a photographic screen.

In the present embodiment, the control device 104 displays an AF frame corresponding to the placement position of a range finding sensor superimposed upon the through image (photographic screen) displayed on the monitor 106. For instance, as shown in FIG. 5, 51 AF frames are displayed on the photographic screen. The camera 100A according to the present embodiment performs focusing using range finding information of the range finding sensor corresponding to one AF frame selected from among the 51 AF frames by the control device 104 performing known AF processing or one AF frame designated by the user.

Figure 6:
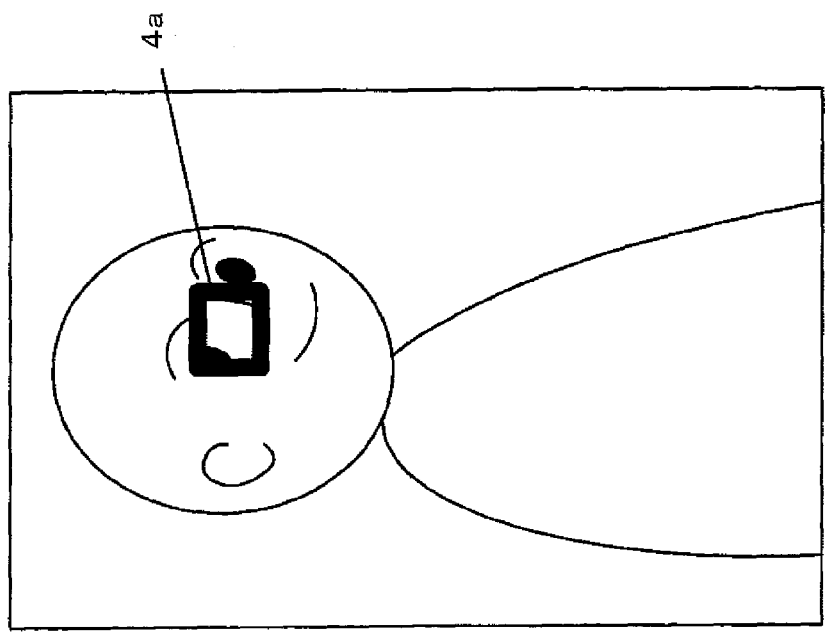
FIG. 6 is a figure showing an example of display of a face detection frame.

In addition, the camera 100A of the present embodiment includes a face detection function so that the control device 104 can detect a human face in a photographic screen by executing a known face detection processing targeting the photographic screen. For example, as shown in FIG. 6, the control device 104 surrounds a region including the detected face with the face detection frame 3a and displays it in the through image so as to present the user with the face detection result. In addition, the control device 104 tracks the detected face between the frames so as to track the subject during through image display and so as to automatically select an AF frame located near the detected face and perform focusing thereupon.

Figure 7:
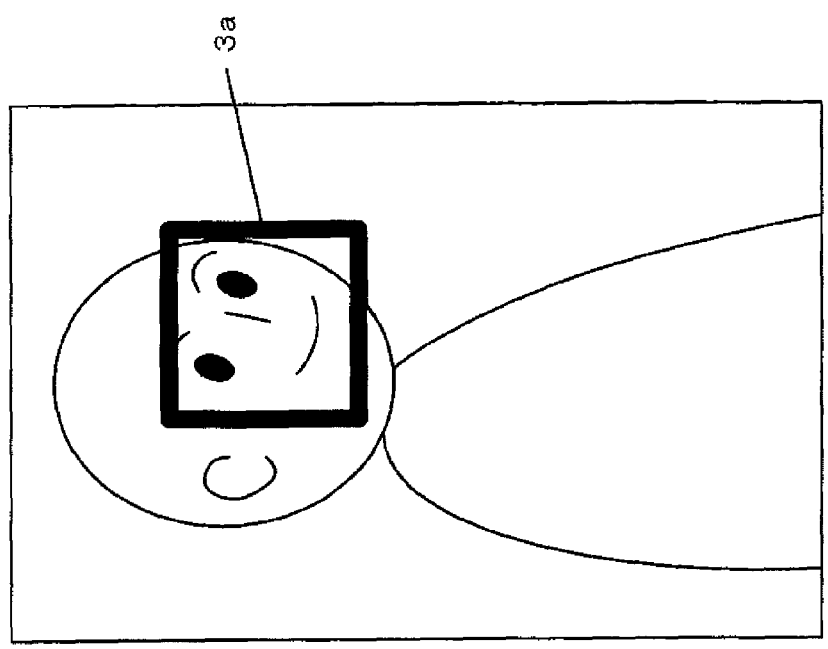
FIG. 7 is a figure showing a concrete example of a case in which a facial feature point and an AF frame are overlapped.

In general, face detection in a photographic screen is carried out by extracting facial feature points such as eyes and a mouth from the photographic screen and, based upon the position relationship of the feature points, by making a decision as to whether or not it is a human face. In this case, with an AF frame being displayed on the photographic screen as in the camera 100A according to the present embodiment, if the feature points such as a human eye and a mouth are overlapped with the display position of a AF frame 4a as shown in FIG. 7, the control device 104 can not detect the facial feature points and therefore may fail to accurately detect the human face. In the second embodiment, the control device 104 performs the following processing so as to solve such a problem.

It is to be noted that after an image in the photographic screen is stored in the buffer memory as an image for face detection, the processing explained below is performed for the image for face detection and does not have an affect on the through image displayed on the monitor 106. In other words, even during the following processing, the photographic screen on which the AF frames shown in FIG. 5 are displayed is continuously displayed on the monitor 106.

Figure 8A:
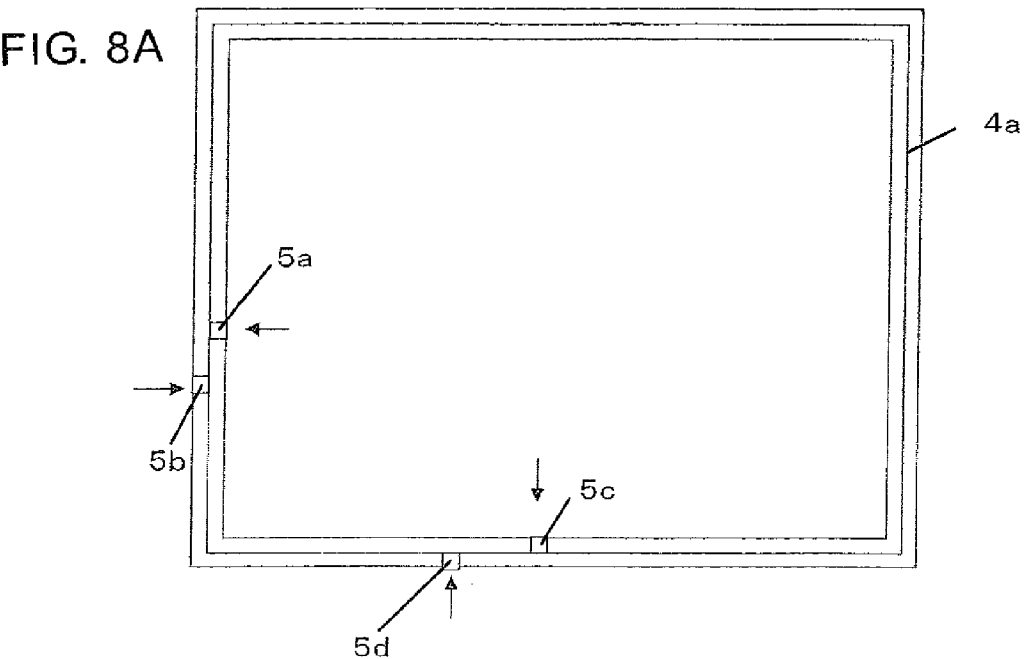
FIGS. 8A to 8C are figures schematically showing an erasure method using adjacent pixels of AF frame in the second embodiment.
Figure 8B:
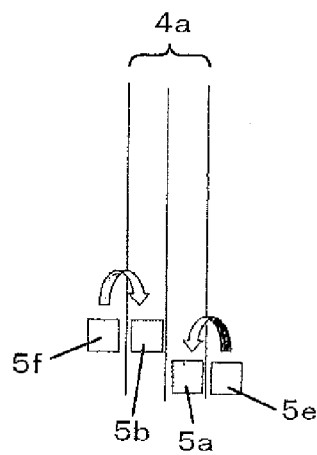
Figure 8C:
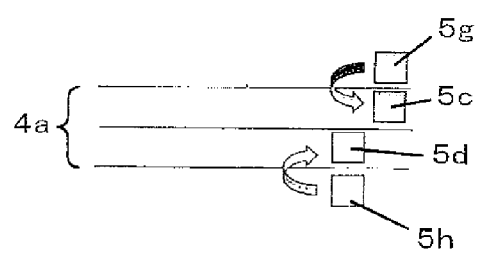

By replacing a pixel on which a frame border of the AF frame 4a lies with an adjacent pixel for all the AF frames 4a in the image for face detection, the control device 104 erases the AF frames 4a and interpolates pixels hidden by the AF frames 4a. For instance, when the width of a frame border of the AF frame 4a is two pixels, as shown in FIG. 8A, the AF frame 4a is constituted with pixels 5a and 5b constituting the vertical frame border and pixels 5c and 5d constituting the horizontal frame border.

Among those pixels, the control device 104 replaces the pixels 5a and 5b constituting the vertical frame border as shown in FIG. 5B. More specifically, the control device 104 replaces the pixel 5a with a pixel 5e adjacent right to the pixel 5a and replaces the pixel 5b with a pixel 5f adjacent left to the pixel 5b. In addition, the control device 104 replaces the pixels 5c and 5d constituting the horizontal frame border as shown in FIG. 5C. More specifically, the control device 104 replaces the pixel 5c with a pixel 5g adjacent over the pixel 5c and replaces the pixel 5d with a pixel 5h adjacent under the pixel 5d.

Figure 9:
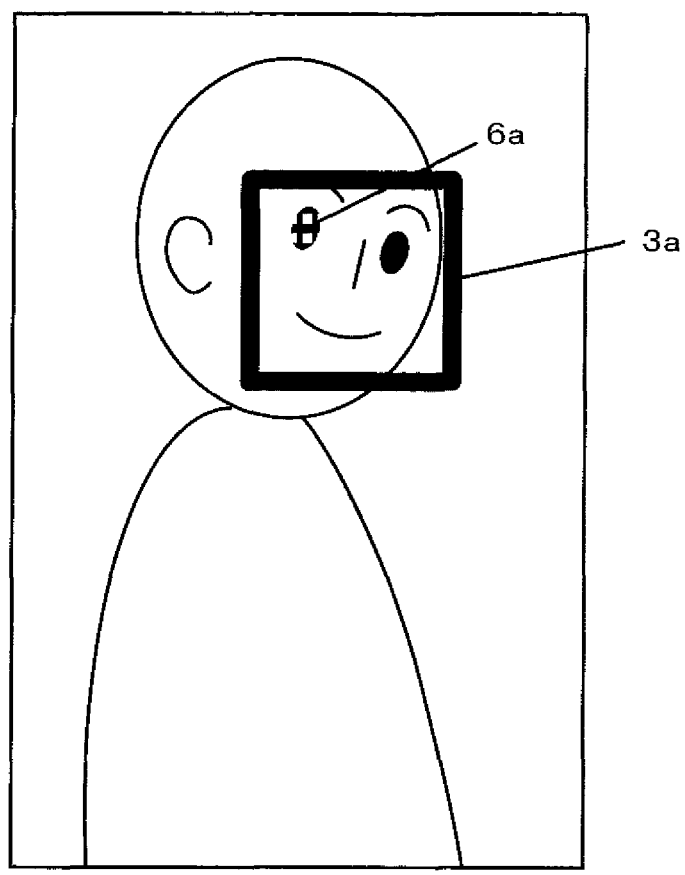
FIG. 9 is a figure showing a face detection result after the AF frame erasure in the second embodiment.

The above processing allows the AF frame 4a to be erased using the adjacent pixels and allows the pixel corresponding to an eye portion 6a having been hidden by the AF frame 4a to be interpolated as shown in FIG. 9 even if the eye of the human is overlapped with the AF frame 4a as shown in FIG. 7. Then, as a result, the control device 104 detects the human face by the face detection processing and causes the detection frame 3a to be displayed on the through image.

According to the second embodiment explained above, the following operations and advantageous effects can be achieved.

(1) It is arranged that the control device 104 replaces the pixel on which the frame border of the AF frame 4a lies with the adjacent pixel so as to erase the AF frame 4a. This allows the AF frame 4a to be erased and allows the pixel corresponding to the eye portion 6a having been hidden by the AF frame 4a to be interpolated, even if the AF frame 4a is overlapped with the facial feature point, and results in achievement of the face detection.

(2) It is arranged to display the AF frame indicating the placement position of the range finding sensor overlapped in the photographic screen. As a result, information that interferes with the face detection can be effectively erased in view of the fact that information disposed in a fixed position in the photographic screen is thus highly likely to hide facial feature points.

The Third Embodiment

In the second embodiment described above, an example in which the control device 104 replaces an pixel with an adjacent pixel for all the AF frames 4a in the image for face detection so as to erase the AF frame 4a is explained. In this case, there is no problem if the facial feature point hidden by the AF frame 4a can be interpolated using the adjacent pixel to an extent to which the face detection is enabled. However, there is also a case in which only a simple replacement using the adjacent pixel can not cause the facial feature point to be interpolated to an extent to which the face detection is enabled, for example, a case in which the AF frame 4a completely hides the facial feature point and the like.

Figure 10C:
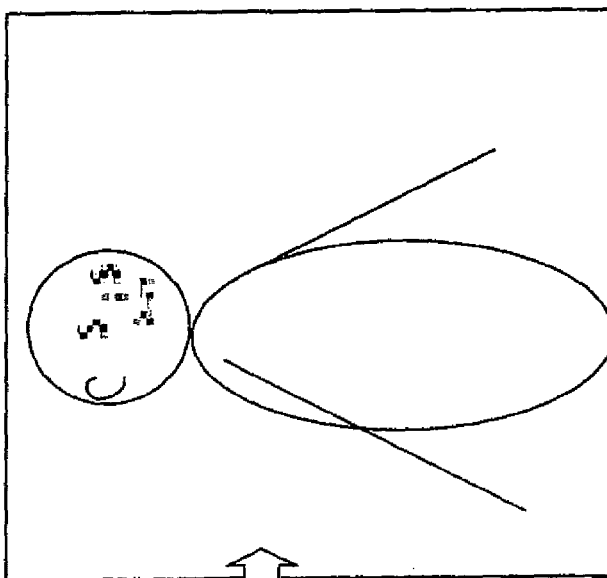
FIGS. 10A to 10C are figures showing a concrete example of a case in which face detection can not be carried out even if the processing shown in the second embodiment are performed.
Figure 10B:
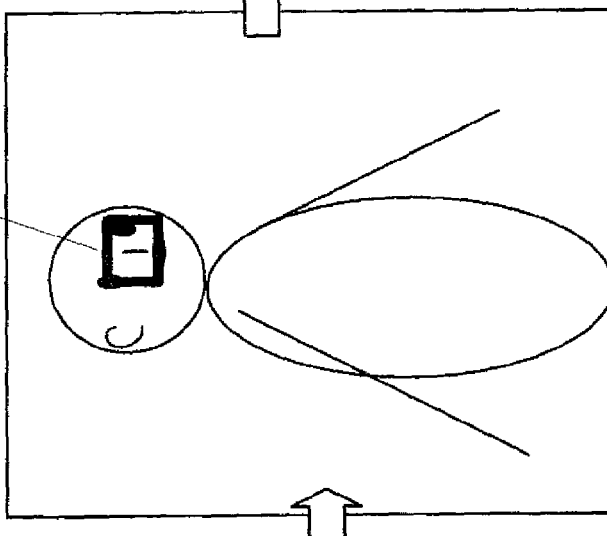
Figure 10A:
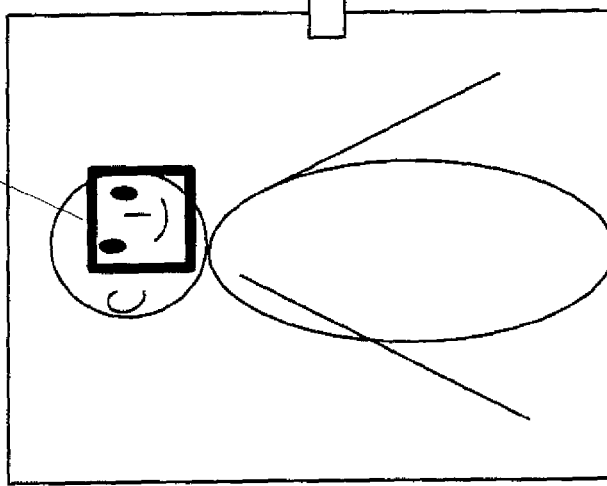

For instance, a case in which face detection is performed so as to display the face detection frame 3a as shown in FIG. 10A will be explained. In this case, with the AF frame 4a hiding most of the eyes and the mouth, which are facial feature points, as shown in FIG. 10B, the eyes and the mouth are highly likely to be collapsed as shown in FIG. 10C even if the AF frame 4a is erased using the method described above in the second embodiment. In this case, the control device 104 is unable to detect the facial feature point and therefore unable to perform the face detection.

In the third embodiment, therefore, processing for enabling the face detection even in such a case will be explained. It is to be noted that FIG. 4 to FIG. 7 described in the second embodiment are also used in the third embodiment, and their description will be curtailed.

In the third embodiment, the control device 104 performs AF processing so as to perform focusing using range finding information of the range finding sensor corresponding to any of the AF frames 4a. Here, it is assumed that the focusing is performed using the range finding information of the range finding sensor corresponding to the AF frame 4a shown in FIG. 10B for example. Then, the AF frame 4a used for the focusing is erased using the method in the second embodiment described above.

Figure 11:
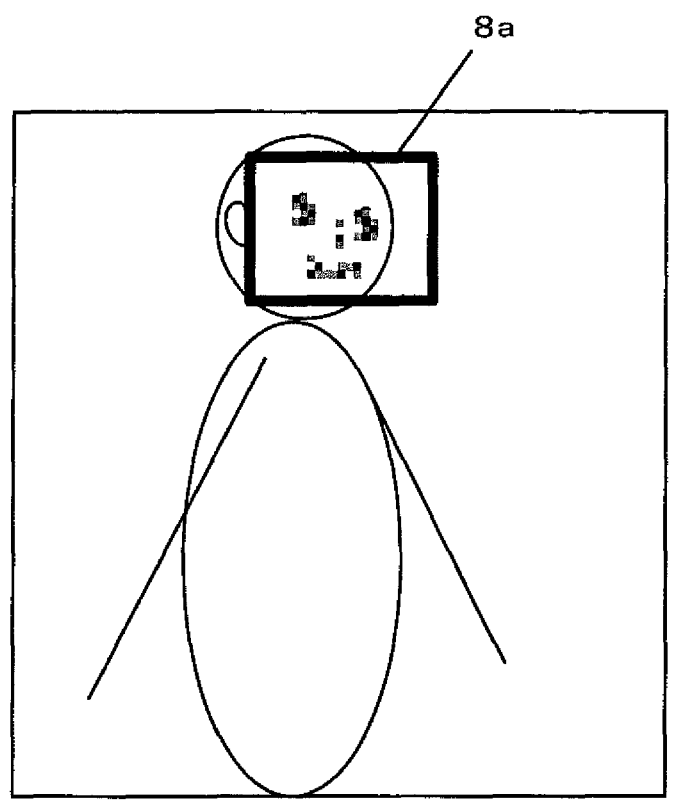
FIG. 11 is a figure showing a concrete example of a case in which a template image is extracted from an image after the AF frame erasure in the third embodiment.
Figure 12:
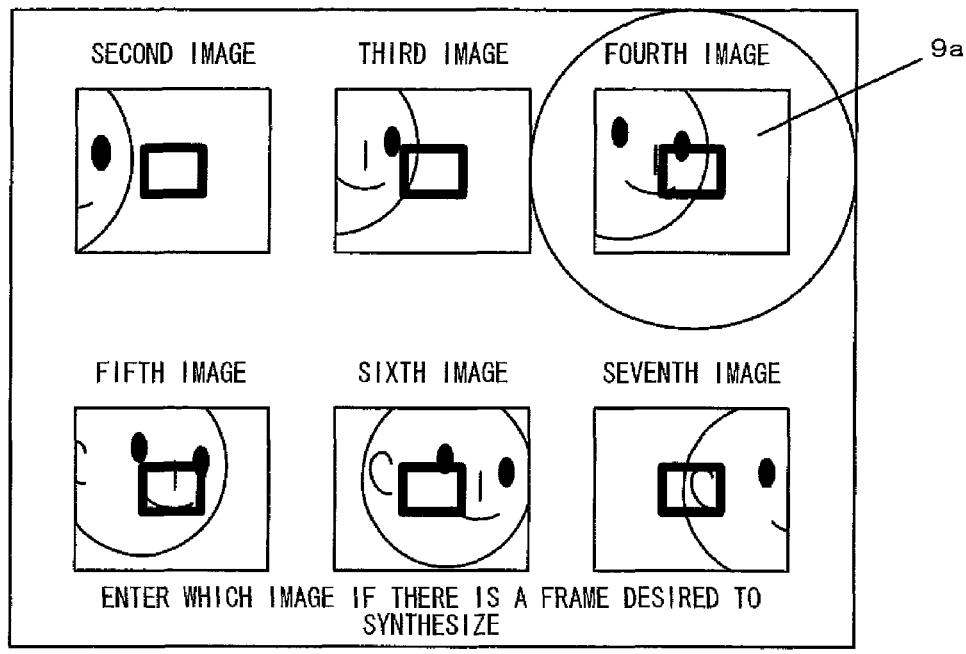
FIG. 12 is a figure showing a synthesis example of an image in the third embodiment.

After that, an image with the size of a predetermined range including the image in the AF frame 4a is extracted. As a result, as shown in FIG. 11, an image in a region 8a is extracted from the photographic screen shown in FIG. 10C. The control device 104 performs template matching with an image after a predetermined number of frames, e.g., after three frames, using the extracted image 8a as a template so as to specify a region with the highest similarity to the template image 8a within the image of after three frames and extract the image in the region. As a result, for instance, an image in a region 9a is extracted from the image after three frames (the fourth frame) as shown in FIG. 12.

The control device 104 erases the AF frame in the photographic screen using the method described above in the second embodiment for the image in the region 9a that is extracted. Then, the control device 104 adds the pixel value of the pixel corresponding to the image in the region 8a shown in FIG. 11 and the pixel value of the pixel corresponding to the image in the region 9a so as to synthesize them into the image shown in FIG. 13. At this time, based upon the result of the template matching, the control device 104 aligns the image in the region 8a and the image in the region 9a so as to synthesize the both images.

Figure 13:
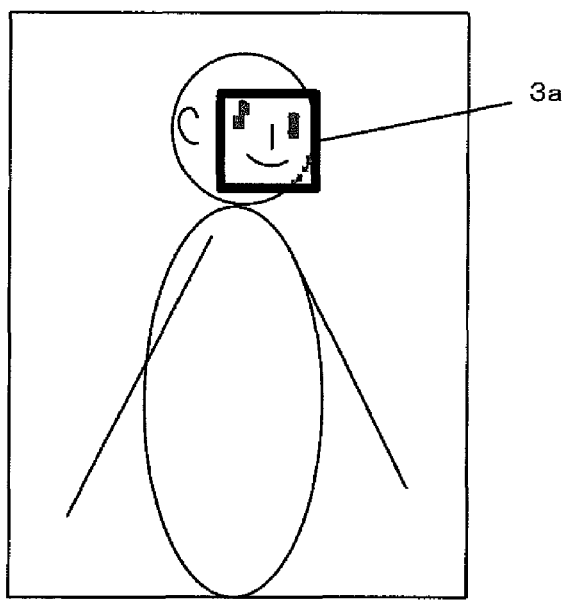
FIG. 13 is a figure showing a face detection result after the AF frame erasure in the third embodiment.

Thus, in the photographic screen shown in FIG. 11. which is equal to FIG. 10C, the facial feature point may be able to be detected using the method according to the third embodiment in this frame as long as the subject position is changed in the photographic screen after a predetermined number of frames even if the facial feature point is collapsed using the method according to the second embodiment. For this reason, if the face detection processing is performed for a synthesized image as shown in FIG. 13, it is highly likely that the face detection frame 3a can be displayed by performing the face detection.

According to the third embodiment explained above, the following advantageous effects can be achieved.

(1) Even in the case where the facial feature point is collapsed using the method according to the second embodiment, if the subject position is changed in the photographic screen after a predetermined number of frames, it becomes highly likely that in this frame the facial feature point can be detected using the method according to the second embodiment. Therefore, in view of this, the face detection can be enabled by synthesizing the regions 8a and 9a.

(2) It is arranged that based upon the result of the template matching, the control device 104 aligns an image in the region 8a and an image in the region 9a so as to synthesize the both images. As a result, it is possible that the image in the region 8a and the image in the region 9a are accurately aligned so as to synthesize them.

VARIATIONS

It is to be noted that the camera of the embodiments described above can be varied as follows.

(1) In the second embodiment described above, an example in which the control device 104 performs processing for an image for face detection so as to erase the AF frame 4a was explained. It may also be arranged that the control device 104 performs the processing of the second embodiment described above only if the face has not been successfully detected as a result of the execution of the face detection processing for the photographic screen.

(2) In addition, it may also be arranged that the processing of the third embodiment is executed only if the face can not be detected none the less even after the face detection processing is attempted after the AF frame 4a is erased using the method presented in the second embodiment.

(3) It may be set in advance which method to adopt, the method presented in the second embodiment or that presented in the third embodiment, or it may be arranged that the user can arbitrarily select it.

(4) In the second embodiment described above, an example in which the AF frame 4a is erased by replacing a pixel on which the frame border of the AF frame 4a lies with an adjacent pixel for all the AF frames 4a in the image for face detection was explained. However, the present invention can be applied even in the event that the facial feature point can not be detected unless a character and an icon that indicate photographic information and the like displayed in the photographic screen are erased, if any.

(5) In the second and the third embodiments described above, an example in which the present invention is applied to the camera 100A was explained. However, the present invention can also be applied to other devices that include a photographic function, for instance, a mobile phone with a built-in camera, a video camera, and the like.

It is to be noted that the present invention may be embodied in any way other than those described in reference to the embodiments as long as the functions characterizing the present invention remain intact. In addition, the present invention may assume a structure in which the embodiments described above and the plurality of variations are combined.

The above described embodiments are examples and various modifications can be made without departing from the scope of the invention.

What is claimed is:

1. A camera comprising:

a first image generating unit for generating a first image that contains a subject image and an autofocus marker superimposed on the subject image;

a buffer memory for storing the first image;

a second image generating unit for generating a second image by erasing the autofocus marker from the first image stored in the buffer memory;

a face detection unit for performing face detection using the second image; and a tracking unit for tracking a subject using the output of the face detection unit.

2. A camera according to claim 1, further comprising:

a third image generating unit for generating a third image by synthesizing a plurality of the second images through template matching, wherein:

the face detection unit performs face detection using the third image.

3. A camera according to claim 1, wherein:

the second image generating unit erases the autofocus marker from the first image by replacing a pixel on the autofocus marker with an adjacent pixel.

* * * * *